(12) United States Patent
Hayashi et al.

(10) Patent No.: US 6,775,065 B2
(45) Date of Patent: Aug. 10, 2004

(54) DIFFRACTION ELEMENT AND OPTICAL PICKUP DEVICE

(75) Inventors: Kenichi Hayashi, Nagano (JP); Tadashi Takeda, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 222 days.

(21) Appl. No.: 09/970,697

(22) Filed: Oct. 5, 2001

(65) Prior Publication Data

US 2002/0060846 A1 May 23, 2002

(30) Foreign Application Priority Data

Oct. 6, 2000 (JP) .................................... P2000-308180

(51) Int. Cl.⁷ .............................................. G02B 5/18
(52) U.S. Cl. ...................... 359/569; 359/566; 359/574; 369/112.03; 369/112.05
(58) Field of Search ................................. 359/565–575; 369/112.03–112.09

(56) References Cited

U.S. PATENT DOCUMENTS

| | | | | |
|---|---|---|---|---|
| 5,260,828 A | * | 11/1993 | Londono et al. ............ | 359/565 |
| 5,745,289 A | * | 4/1998 | Hamblen ..................... | 359/565 |
| 6,067,106 A | * | 5/2000 | Ishibe et al. ................ | 347/258 |
| 6,134,039 A | * | 10/2000 | Rudeen ....................... | 359/196 |
| 6,337,841 B1 | * | 1/2002 | Kim et al. ............. | 369/112.06 |
| 6,381,387 B1 | * | 4/2002 | Wendland, Jr. .............. | 385/37 |
| 6,477,130 B2 | * | 11/2002 | Takahashi ............... | 369/112.28 |
| 6,501,601 B1 | * | 12/2002 | Takasuka et al. ........... | 359/569 |
| 2002/0051293 A1 | * | 5/2002 | Nakai ..................... | 369/112.28 |

FOREIGN PATENT DOCUMENTS

JP 62-236145 * 10/1987

OTHER PUBLICATIONS

C.Palmer, "Diffraction Grating Handbook", Thermo RGL, 2002, pp. 100–101.*

* cited by examiner

Primary Examiner—Leo Boutsikaris
(74) Attorney, Agent, or Firm—Sughrue Mion, PLLC

(57) ABSTRACT

In a diffraction element, a diffraction grating is formed with a grating pitch having different diffraction angles in accordance with a wavelength of a laser light beam incident thereon. The wavelength is variable in accordance with an environment temperature. The diffraction element is made of a material having a linear expansion coefficient which causes thermal variation in the grating pitch enough to compensate at least a part of the diffraction angle variation due to environment temperature change.

12 Claims, 9 Drawing Sheets

DIFFRACTION ELEMENT AND OPTICAL PICKUP DEVICE

BACKGROUND OF THE INVENTION

The present invention relates to a diffraction element for use to diffract a laser light, which is emitted from a laser diode in an optical pickup device or the like, into three beams. More particularly, the invention relates to a diffraction element that can suppress or cancel a variation in the diffraction angle caused by a wavelength variation of the laser light that occurs with a temperature change.

A main stream of the DVD reproducing apparatuses is a so-called two laser type in which a 650 nm laser diode for reproducing the DVD and a 780 nm laser diode for reproducing/recording the CD-R are mounted to allow the CD-R to be reproduced. An optical pickup device mounted on such a reproducing apparatus is desirably made in smaller size and with lower price by reducing the number of optical members.

In recent years, a single lens system in which an objective lens is used commonly for both wavelengths has been established, and a so-called twin laser diode (Twin-LD) has been developed in which laser diodes having different wavelengths are integrated on a single semiconductor substrate, whereby the twin laser diode has been mounted as a laser light source of the optical pickup device. Also, for an optical element disposed between the laser light source and the objective lens, an optical element with wavelength selectivity for offering desired actions to two-wavelengths has been employed, instead of disposing a separate optical element for each wavelength.

For example, in connection with a diffraction element for producing three beams required for servo-controlling an optical spot position formed on an optical recording medium by the optical pickup device, diffraction elements provided for each wavelength was conventionally mounted on the optical system, but a diffraction element with wavelength selectivity (hereinafter referred to as a "two-wavelength grating" in this specification) to provide the desired diffraction angle and diffraction efficiency for each of two-wavelengths has been recently employed.

Also, in order to detect a return light reflected from the recording face of the optical recording medium, a single detector which is commonly applicable for laser light beams of two-wavelengths has been recently employed. In this case, if the twin laser diode is mounted, laser light beams of two-wavelengths emitted from such laser light source will proceed in almost parallel, and is by no means converged at the same point in the single detector. Thus, a new diffraction element with wavelength selectivity (hereinafter referred to as an "optical path composition element" in this specification) has been employed by changing the proceeding direction of a laser light of one wavelength to converge the laser light beams of two-wavelengths at the same point.

Herein, such diffraction element for use as the two-wavelength grating or optical path composition element is typically made of inorganic material with less thermal distortion. Such diffraction element has negligible thermal deformation caused by a change in the environmental temperature in the optical pickup device. In other words, because a grating pitch variation on the diffraction grating face due to thermal deformation can be ignored, the laser light of fixed wavelength can be diffracted at a desired angle, irrespective of temperature change.

However, a portion of the optical pickup device affected by a change in the environmental temperature is not only the optical element, but also the laser light source which is affected by heat. The laser light source has an oscillation wavelength fluctuated along with the change of the environmental temperature. As a result, the wavelength of the laser light incident upon the diffraction element is also fluctuated, and the diffraction angle is varied in accordance with the wavelength fluctuation. If the diffraction angle is varied, for example, in a case of the optical path composition element, such a trouble may arise that the laser light beams of two-wavelengths can not be converged at the same point.

For example, in a second laser light with a wavelength of 780 nm, the wavelength is varied from 784.7 nm to 793.6 nm, when the environmental temperature is changed from 20° C. to 60° C., resulting in a wavelength fluctuation of about 10 nm.

For example, the optical path composition element for diffracting a laser light with a wavelength of 780 nm as shown in FIG. 8 is exemplified. Five samples of the related optical path composition element made of inorganic material were prepared, and the change in the diffraction angle for each sample was measured when the environmental temperature was changed from 20° C. to 60° C. by every 10° C. Thereby, the result was obtained as shown in a graph of FIG. 9. The diffraction angle for each of five samples was varied similarly to the theoretical values calculated from the grating pitch as indicated by the dashed line, whereby the diffraction angle was changed from 1.322 to 1.337 degrees when the environmental temperature was changed from 20° C. to 60° C. That is, the diffraction angle was changed by 0.015 degrees when the environmental temperature was changed from 20° C. to 60° C. This value corresponds to a coefficient of variation of 1.1% with respect to an diffraction angle of 1.322 degrees at an environmental temperature of 20° C. In FIG. 8, the diffracted state at an environmental temperature of 20° C. is indicated by the dashed line, and the diffracted state at an environmental temperature of 60° C. is indicated by the solid line.

If this variation in the diffraction angle is represented by the displacement amount of a light beam spot converging on the light receiving face of the photo detector, the result is shown in a graph of FIG. 10. The displacement amount of light beam spot for five samples revealed the almost same change as the theoretical values as indicated by the dashed line that is calculated from the variation in wavelength. It was found that the spot position is moved 1.83 μm when the environmental temperature was changed from 20° C. to 60° C.

Herein, the permissible range of spot displacement in the photo detector that is required in the typical optical pickup device is 2 μm. Accordingly, there is no margin for the permissible displacement range at 70° C. which is an upper limit of a guaranteed temperature range of the optical pickup device, resulting in lower yield of products.

This problem also arises with the laser light having a wavelength of 650 nm. Also, it likewise occurs in the two-wavelength grating.

SUMMARY OF THE INVENTION

In view of the above-mentioned problems, it is an object of the present invention to provide a diffraction element of wavelength selectivity that can suppress or cancel a variation in the diffraction angle caused by a laser wavelength variation that arises with a change in the environmental temperature.

In order to accomplish the above object, according to the present invention, there is provided a diffraction element comprising a diffraction grating formed with a grating pitch having different diffraction angles in accordance with a wavelength of a laser light beam incident thereon, the wavelength being variable in accordance with an environment temperature, wherein the diffraction element is made of a material having a linear expansion coefficient which causes thermal variation in the grating pitch enough to compensate at least a part of the diffraction angle variation due to environment temperature change.

Herein, if the diffraction element of the invention is made of a material having a linear expansion coefficient in a range from $5 \times 10^{-5}/°$ C. to $3 \times 10^{-4}/°$ C., on the basis of the laser light wavelength (650 nm or 780 nm) for use with the typical optical pickup device and the permissible error required for the optical system, a variation in the diffraction angle caused by a wavelength variation that arises with a temperature change can be canceled by a grating pitch change due to thermal expansion or contraction of the diffraction element, to such an extent as to give rise to no practical trouble.

In the case where the diffraction element of the invention is employed as a two-wavelength grating in an optical pickup device, the diffraction characteristics may be set up such that the zeroth-order diffraction efficiency for one of the center wavelengths of 650 nm and 780 nm is 90% or more, and the first-order diffraction efficiency for the other is in a range from 10 to 20%.

In the case where the diffraction element of the invention is employed as an optical path composition element in an optical pickup device, it is preferable that the diffraction grating is a blazed diffraction grating in which each slant face is composed of a plurality of stepped faces. Here, it is preferable that each slant face includes 4 to 6 stepped faces.

Preferably, the diffraction characteristics may be set up such that the zeroth-order diffraction efficiency for one of the center wavelengths of 650 nm and 780 nm is 70% or more, and the first-order diffraction efficiency for the other is 50% or more.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION OF THE PREFERRED EMBODIMENTS

The preferred embodiments of the present invention will be described below with reference to the accompanying drawings.

Figure 1:
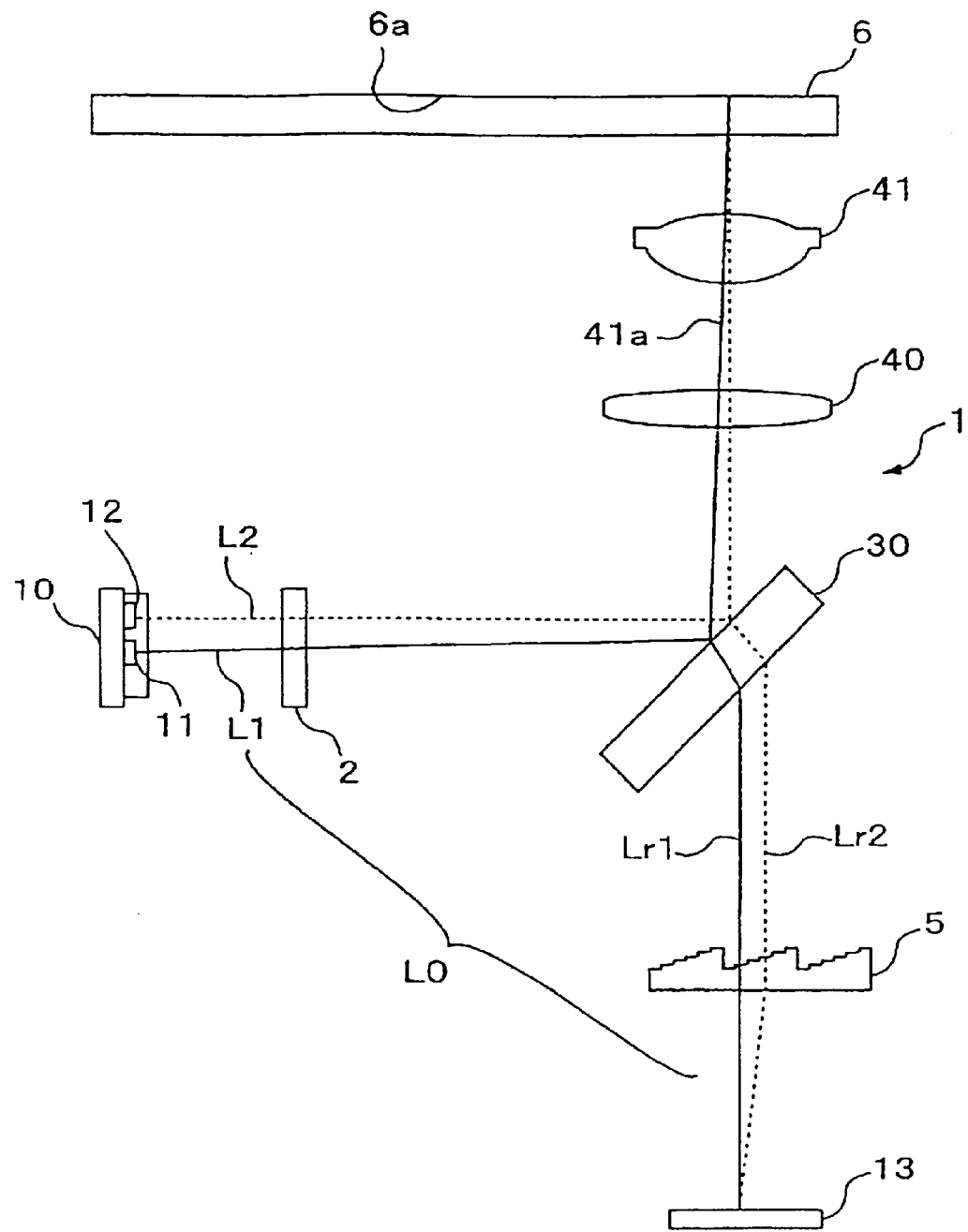
FIG. 1 is a schematic view showing an optical system of a two-wavelength optical pickup device provided with diffraction elements of the present invention.

FIG. 1 is a schematic view showing an optical system of an optical pickup device in which diffraction elements according to the invention are disposed. As shown in FIG. 1, the optical pickup device 1 records or reproduces the information on or from several kinds of optical recording medium 6 having a different substrate thickness or recording density, such as CD, CD-R or DVD, and comprises a two-wavelength laser light source unit 10 having a laser light source 11 for emitting a laser light beam L1 with a wavelength of 650 nm as indicated by the solid line and a laser light source 12 for emitting a laser light beam L2 with a wavelength of 780 nm as indicated by the dashed line that are contained within a common package, and a common optical system Lo. The laser light beam L1 and the laser light beam L2 have the light emitting points separated by about 110 μm, for example.

The common optical system Lo comprises an arrangement of a two-wavelength grating 2 for transmitting the laser light beam L1 emitted from the two-wavelength light source unit 10 and separating the laser light beam L2 into three beams to generate a tracking error signal, a plate-like beam splitter 30 for reflecting partially the laser light beam L1 and the laser light beam L2 separated into three beams, a collimator lens 40 for making the laser light beams L1, L2 reflected from the beam splitter 30 parallel, and an objective lens 41 for converging the laser light beams L1, L2 emerging from the collimator lens 40 onto a recording face 6a of the optical recording medium 6. The two-wavelength grating 2 is a diffraction element constructed according to the invention.

Also, the common optical system Lo has a common light receiving element 13 arranged to receive the return light beams Lr1, Lr2 of the laser light beams L1, L2 having passed through the beam splitter 30, after being reflected from the recording face 6a of the optical recording medium 6. Between the beam splitter 30 and the light receiving element 13, an optical path composition element 5 is arranged to lead the misaligned return light beams Lr1, Lr2 to a common light receiving plane on the common light receiving element 13. This optical path composition element 5 is also a diffraction element constructed according to the invention.

In this embodiment, the optical axis of the laser light beam L1 emitted from the laser light source 11 is made coincident with a system optical axis 41a (optical axis of the objective lens 41) for the optical pickup device 1. Accordingly, the laser light beam L2 emitted from the other laser light source 12 passes through the common optical system Lo while being misaligned with respect to the system optical axis 41a, and is deflected slightly by the optical path composition element 5 and led onto the common light receiving plane of the common light receiving element 13.

In the optical pickup device 1 with the above constitution, in reproducing the information from a DVD as the optical recording medium 6, the laser light beam L1 with a wavelength of 650 nm is emitted from the laser light source 11. This laser light beam L1 is led to the common optical system Lo, and converged as a light spot onto the recording face of the DVD by the objective lens 41, and the return light beam Lr1 of the laser light beam L1 reflected from the recording face of the DVD is converged via the beam splitter 30 and the optical path composition element 5 onto the common light receiving element 13. The information of DVD is reproduced by a signal detected by the common light receiving element 13.

In contrast, in reproducing the information from a CD-R as the optical recording medium 6, the laser light beam L2 with a wavelength of 780 nm is emitted from the other laser light source 12. This laser light beam L2 is also led to the common optical system Lo, and converged as a light spot onto the recording face of DVD by the objective lens 41, and the return light beam Lr2 of the laser light beam L2 reflected from the recording face of the CD-R is converged via the beam splitter 30 and the optical path composition element 5 onto the common light receiving element 13. The information of CD-R is reproduced by a signal detected by the common light receiving element 13.

Figure 2:
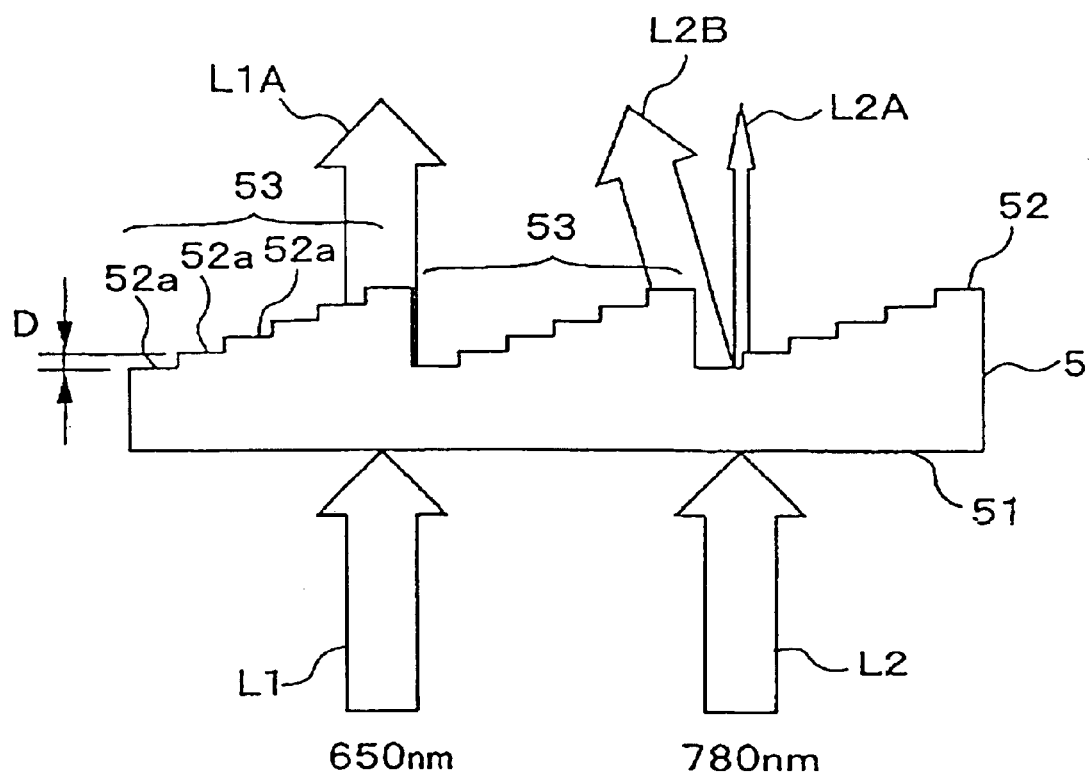
FIG. 2 is a cross-sectional view showing an optical path composition element shown in FIG. 1.

The optical path composition element 5 of this embodiment is a resin molded plate member. As shown in FIG. 2, one face is made flat as an incident face 51 and a diffraction grating is formed on the other face as an emergent face 52. The diffraction grating is formed such that each slant face constitutes a blazed diffraction grating is made stepwise by providing a plurality of stepped faces 52a. This structure is referred to as a binary blazed diffraction grating.

A step difference D of each step portion 53, that is, a height D of step on each stepped face is so determined that a phase difference between light beams transmitting adjacent stepped faces occurred by the height D is equal to the wavelength for the laser light beam L1 having a wavelength of 650 nm, so that the laser light beam L1 is passed in straight manner as the zeroth-order diffracted light beam L1A, without bringing about the diffracting action. This height D can be calculated by the following expression, assuming that the refractive index for the first laser light beam L1 having a wavelength of 650 nm is n1, and the wavelength 650 nm is λ1, $$D = \frac{\lambda 1}{n1 - 1}$$

Since a step portion 53 is the blazed diffraction grating, whereby among the zeroth-order diffracted light beam L2A proceeding straightly, and the positive first-order diffracted light beam and negative first-order diffracted light beam that are deflected on both sides, the positive first-order diffracted light beam L2B has high diffraction efficiency for the laser light beam L2 having a wavelength of 780 nm.

Figure 3:
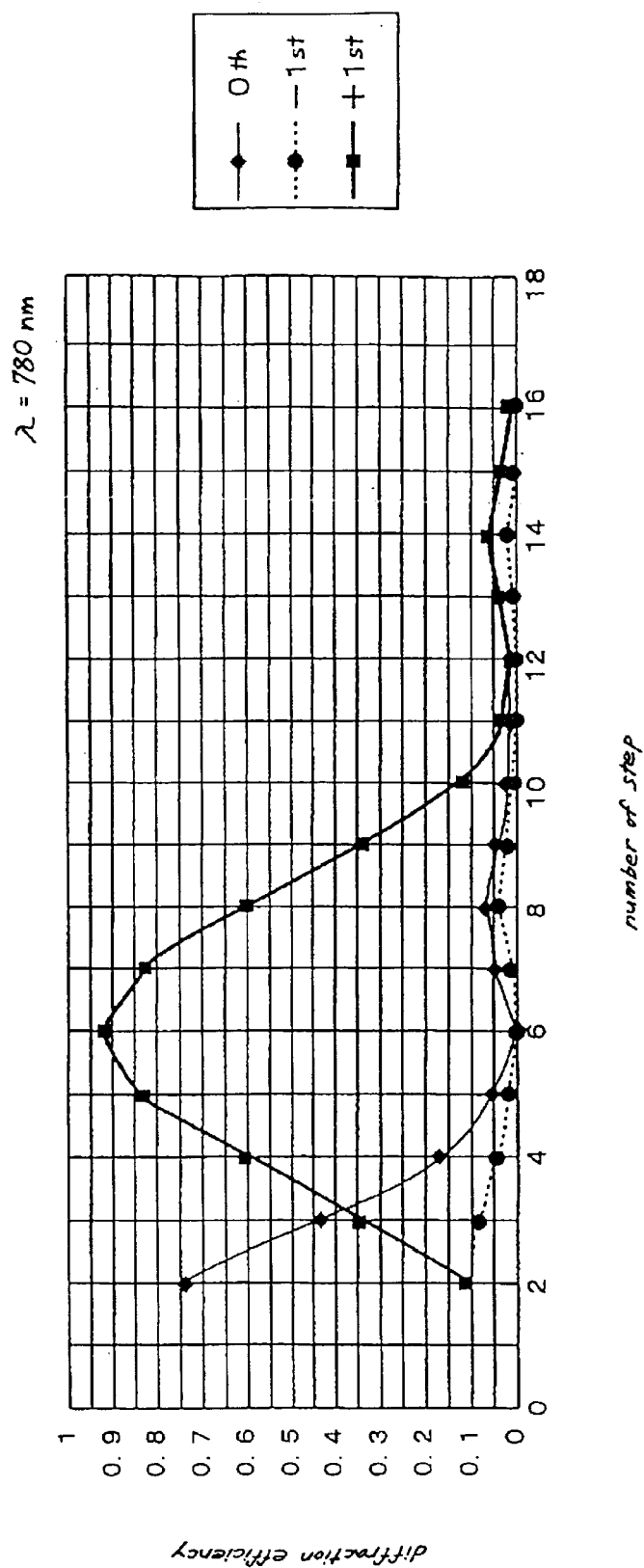
FIG. 3 is a graph showing the relation between the diffraction efficiency of a laser light having a wavelength of 780 nm that can be transmitted through the optical path composition element shown in FIG. 2, and the number of steps on an emergent face.

Herein, the diffraction efficiency can be determined in accordance with the number of steps on the stepped face. As shown in FIG. 3, assuming that the number of steps on the stepped face is taken along the X-axis, and the diffraction efficiency is taken along the Y-axis, the number of steps that is capable of decreasing the diffraction efficiency of negative first-order diffracted light and increasing the diffraction efficiency of positive first-order diffracted light is from 4 to 6 steps, in which the diffraction efficiency of positive first-order diffracted light is from 60 to 90%. In this embodiment, six steps are set up.

Accordingly, the optical path composition element 5 allows the laser light beam L1 having a wavelength of 650 nm to proceed straightly as the zeroth-order diffracted light beam L1A, and allows the laser light beam L2 having a wavelength of 780 nm to be deflected as the positive first-order diffracted light beam L2B at a higher diffraction efficiency than the zeroth-order diffracted light beam L2A and converged onto the common light receiving element.

Also, the resin material of the optical path composition element 5 in this embodiment has a linear expansion coefficient in a range from $0.5 \times 10^{-4}/°$ C. to $3 \times 10^{-4}/°$ C. The typical resin materials and linear expansion coefficients are listed such as:

| Polycarbonate | $2.0 \times 10^{-4}/°$ C. |
| Polystyrene | $1.8$–$2.4 \times 10^{-4}/°$ C. |
| Polymethyl methacrylate | $1.3 \times 10^{-4}/°$ C. |

Herein, the inorganic materials used for the related optical path composition element and linear expansion coefficients are listed such as:

| Optical glass | $0.15$–$0.45 \times 10^{-4}/°$ C. |
| Quartz glass | $0.017 \times 10^{-4}/°$ C. |

Accordingly, the resin material used for the optical path composition element in this embodiment has a linear expansion coefficient about 10 times larger than the inorganic materials.

Figure 4:
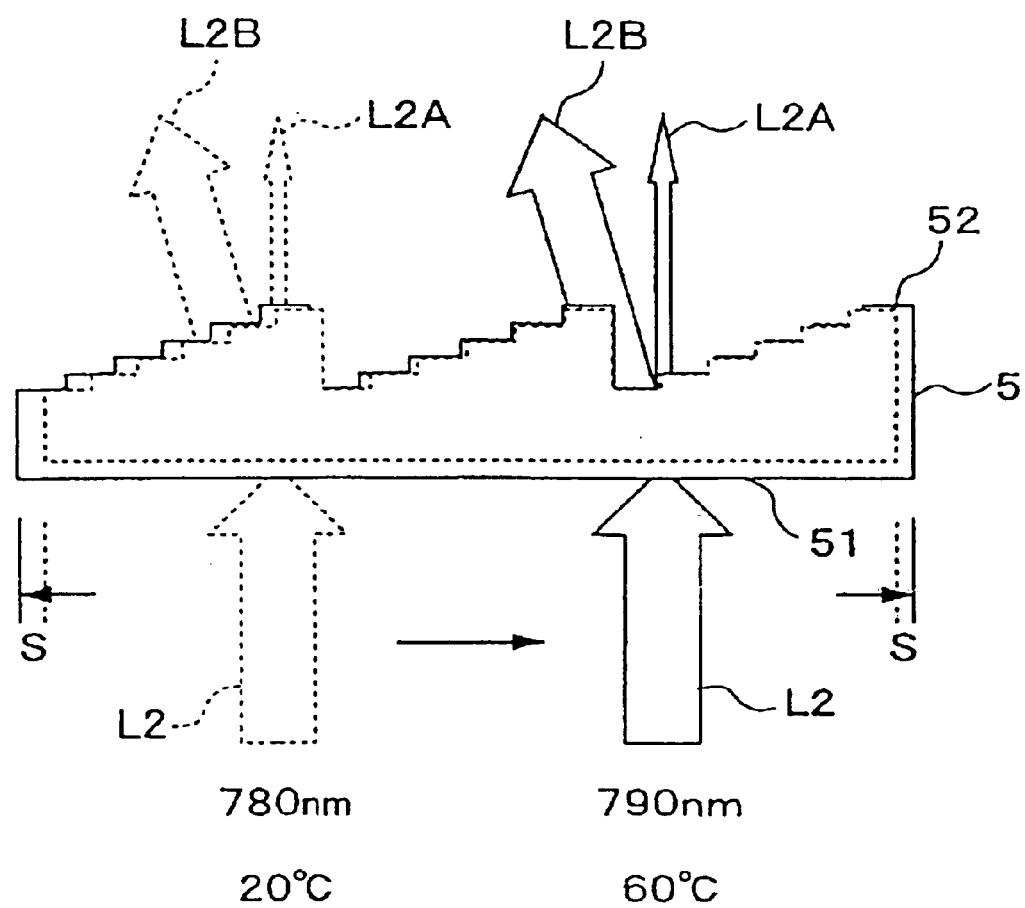
FIG. 4 is an explanatory view showing the relation between the wavelength variation of a laser light having a wavelength of 780 nm in the optical path composition element shown in FIG. 2 and the variation in the diffraction angle, when the environmental temperature is changed.

As shown in FIG. 4, when the environmental temperature is changed from 20° C. to 60° C., the optical path composition element 5 constructed in this way is thermally deformed from the shape indicated by the dashed line to the shape indicated by the solid line, as shown by the arrows S, so as to elongate laterally. At this time, the resin material constituting the optical path composition element 5 of this embodiment is elongated about 10 times longer than the related inorganic materials. If the optical path composition element 5 is elongated, the grating pitch (width of each stepped face) on a grating face of the emergent side is also broadened.

As a result, the diffraction grating pitch is broadened, and even if the second laser light beam L2 having a wavelength of 780 nm has the wavelength increased from 780 nm as indicated by the dashed line to 790 nm as indicated by the solid line, due to a change in the environmental temperature, the variation in the diffraction angle for the positive first-order diffracted light beam L2B is reduced.

The variation in the diffraction angle is stated such that the variation in the diffraction angle at an environmental temperature of 60° C. can be reduced to 1% or less of the diffraction angle at an environmental temperature of 20° C., if the resin material for the optical path composition element 5 has a linear expansion coefficient from $0.5 \times 10^{-4}/°$ C. to $3 \times 10^{-4}/°$ C. Also, if the resin material has a linear expansion coefficient of $3\times10^{-4}/°$ C., the variation in the diffraction angle can be fully canceled.

Figure 5:
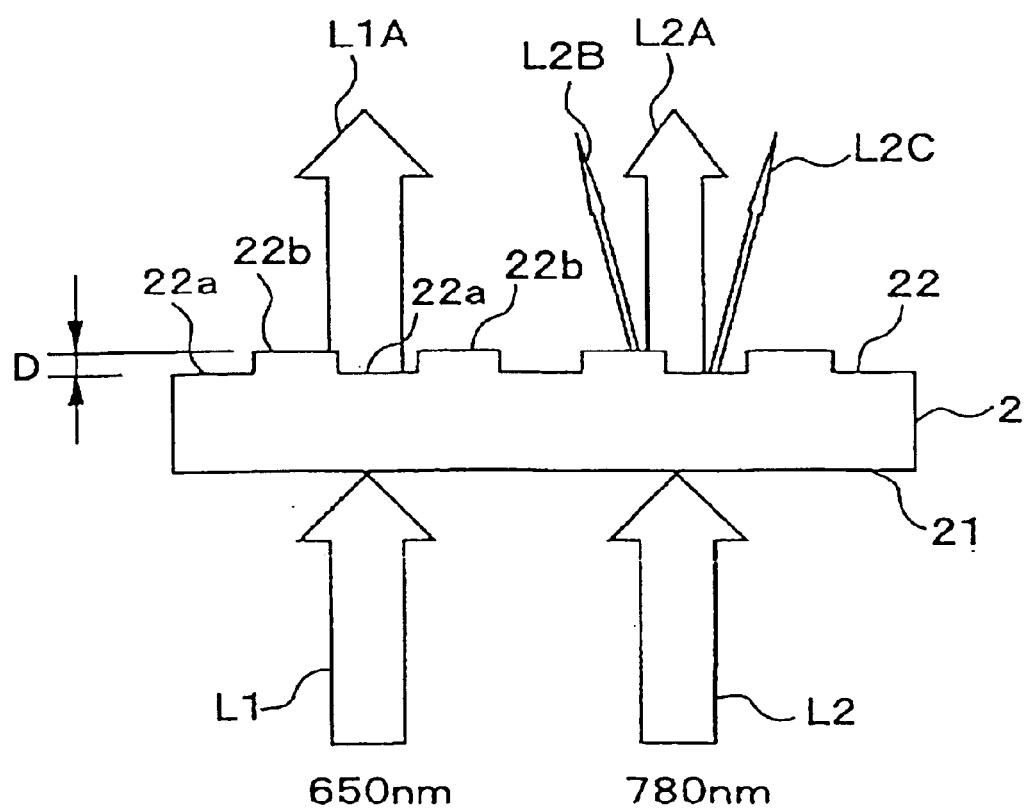
FIG. 5 is a cross-sectional view showing a two-wavelength grating according to a first embodiment of the invention.

As shown in FIG. 5, the two-wavelength grating 2 of this embodiment is a resin molded plate member. One face is made a flat as an incident face 21, and a concave and convex diffraction grating is formed on the other face as an emergent face 22. This diffraction grating is consist of a concave face 22a and a convex face 22b formed periodically. The resin material for the two-wavelength grating 2 in this embodiment, like the optical path composition element 5, has a linear expansion coefficient from $0.5\times10^{-4}/°$ C. to $3\times10^{-4}/°$ C.

A height (step difference) D of the convex face 22b from the concave face 22a is determined in the same way as the optical path composition element 5, such that supposing that a phase difference between light beams transmitting adjacent concave and convex faces occurred by the height D is equal to the wavelength for the laser light beam L1 having a wavelength of 650 nm, so that the laser light beam L1 is passed in straight manner as the zeroth-order diffracted light beam L1A, without bringing about the diffracting action.

On the other hand, the laser light beam L2 having a wavelength of 780 nm is separated into three beams of the zeroth-order diffracted light beam L2A proceeding straightly, and the positive first-order diffracted light beam L2B and the negative first-order diffracted light beam L2C that are deflected on both sides.

Accordingly, the two-wavelength grating 2 allows the laser light beam L1 having a wavelength of 650 nm to proceed straightly as the zeroth-order diffracted light beam L1A, and allows the laser light beam L2 having a wavelength of 780 nm to be separated into the zeroth-order diffracted light beam L2A, the positive first-order diffracted light beam L2B and the negative first-order diffracted light beam L2C to produce a tracking error signal.

Figure 6:
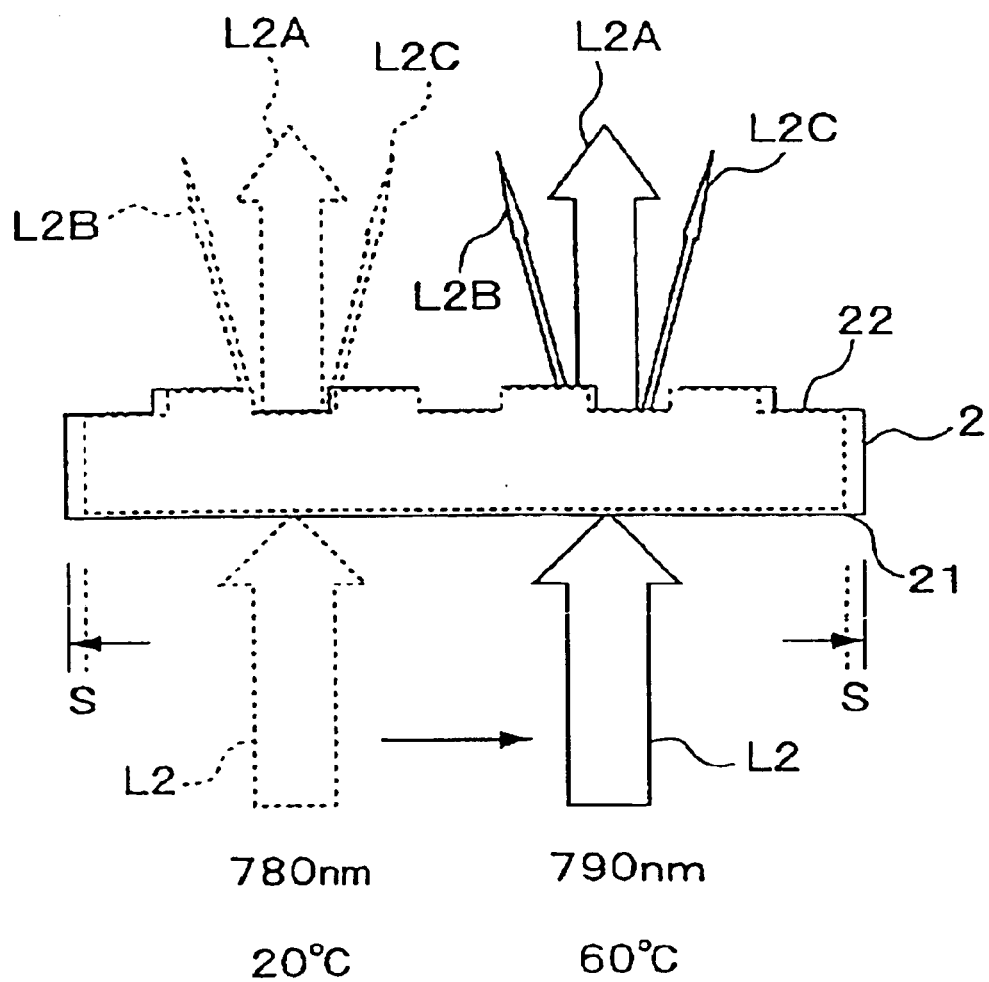
FIG. 6 is an explanatory view showing the relation between the wavelength variation of a laser light being transmitted through the two-wavelength grating shown in FIG. 5, and the variation in the diffraction angle.

As shown in FIG. 6, when the environmental temperature is changed from 20° C. to 60° C., the two-wavelength grating 2 constructed in this way is thermally deformed from the shape indicated by the dashed line to the shape indicated by the solid line, as shown by the arrows S, so as to elongate laterally. At this time, the resin material constituting the two-wavelength grating 2 of this embodiment is elongated about 10 times longer than the related inorganic materials. Consequently, the grating pitch is also broadened, and even if the laser light beam L2 having a wavelength of 780 nm has the wavelength increased from 780 nm as indicated by the dashed line to 790 nm as indicated by the solid line, due to a change in the environmental temperature, the variation in the diffraction angle for the positive first-order diffracted light beam L2B and the negative first-order diffracted light beam L2C can be reduced. The variation in the diffraction angle is stated such that the variation in the diffraction angle at an environmental temperature of 60° C. can be reduced to 1% or less of the diffraction angle at an environmental temperature of 20° C., if the resin material for the two-wavelength grating 2 has a linear expansion coefficient from $0.5\times10^{-4}/°$ C. to $3\times10^{-4}/°$ C. Also, if the resin material has a linear expansion coefficient of $3\times10^{-4}/°$ C., the variation in the diffraction angle can be fully canceled.

In the above example, the step difference D between the concave face 22a and the convex face 22b formed on the emergent face 22 is so small that the laser light beam L1 having a wavelength of 650 nm is given no diffracting action. However, the laser light beam L2 having a wavelength of 780 nm may be given no diffracting action. In this case, the step difference D1 can be calculated by the following expression, assuming that the refractive index for the laser light beam L2 having a wavelength of 780 nm is n2, and the wavelength 780 nm is λ2, $$D1 = \frac{\lambda 2}{n2 - 1}$$

whereby the laser light having a wavelength of 780 nm has a phase lag equal to the wavelength thereof due to the step difference D1, and is passed as the zeroth-order diffracted light without being affected by the diffracting action.

In the above examples, the optical path composition element 5 and the two-wavelength grating 2 have a face on which diffraction grating is formed arranged as the emergent face, but the face on which the diffraction grating is formed may be arranged as the incident face.

Figure 7:
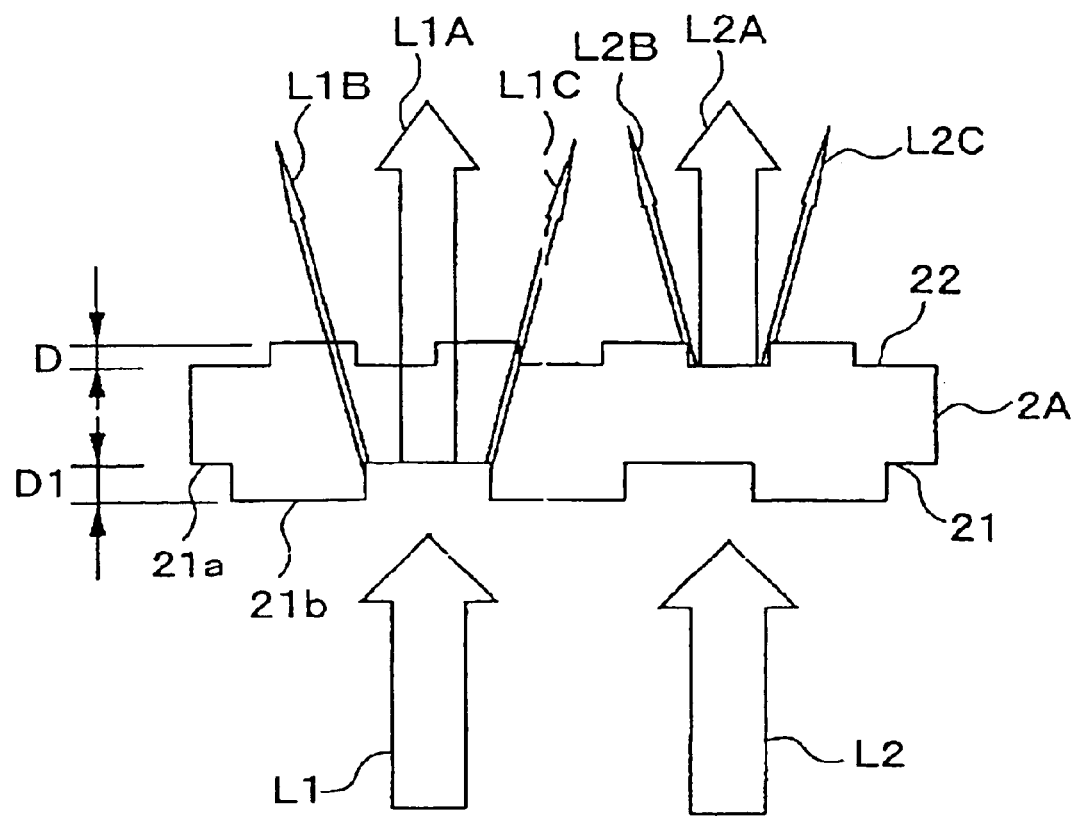
FIG. 7 is an explanatory view showing a two-wavelength grating according to a second embodiment of the invention.
Figure 8:
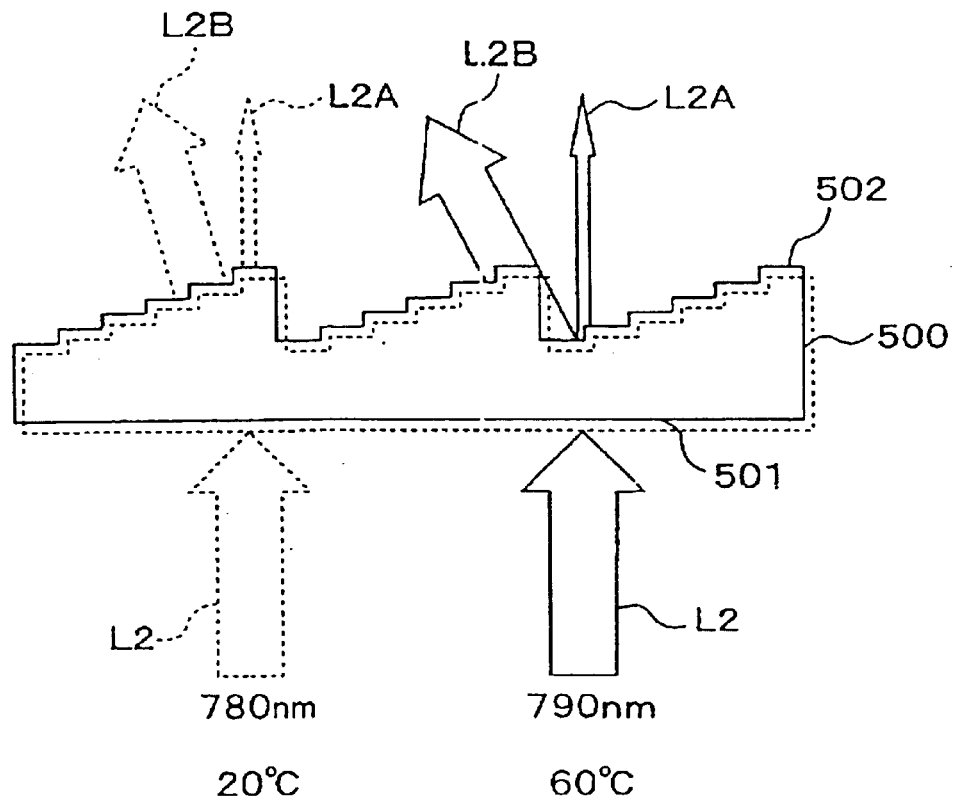
FIG. 8 is a view showing a related optical path composition element provided with wavelength selectivity.
Figure 9:
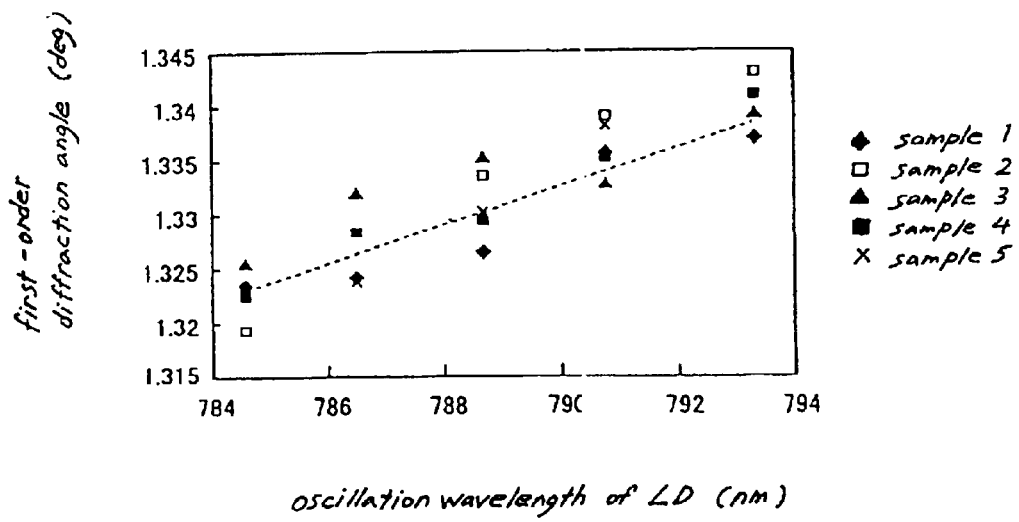
FIG. 9 is a graph showing the relation between the wavelength variation of a laser light having a wavelength of 780 nm in the related optical path composition element and the variation in the diffraction angle, when the environmental temperature is changed.
Figure 10:
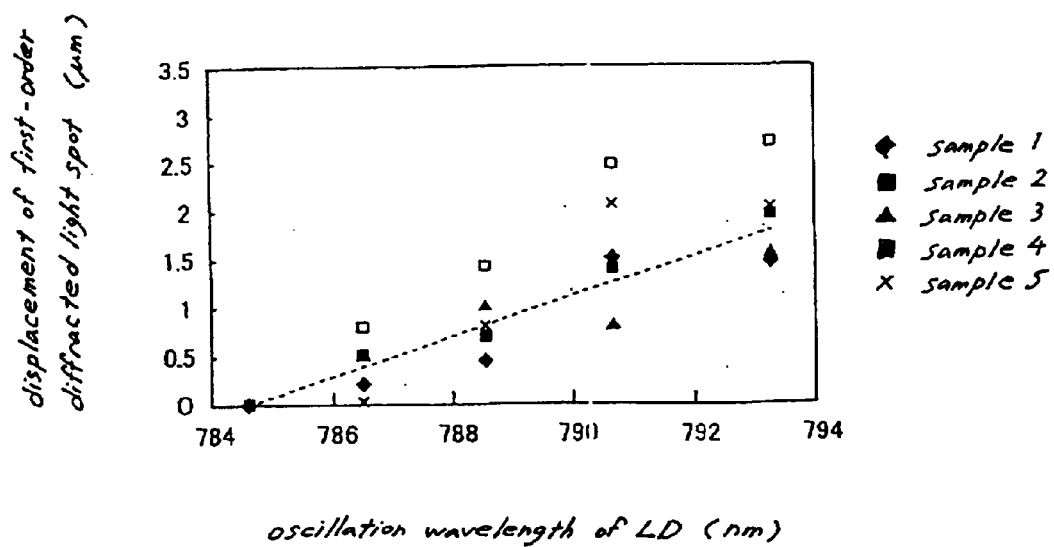
FIG. 10 is a graph showing the relation between the wavelength variation of a laser light having a wavelength of 780 nm in the related optical path composition element and the displacement amount of a spot position, when the environmental temperature is changed.

The two-wavelength grating 2 may be configured such that, a convex and concave structure with a step difference D1 that has no diffracting action for the laser light having a wavelength of 780 nm is provided on the incident face 21. As shown in FIG. 7, a two-wavelength grating 2A has a concave face 21a and a convex face 21b with the step difference D1 formed on the incident face 21 to have no diffracting action with respect to the laser light beam L2 having a wavelength of 780 nm, and has a concave face 22a and a convex face 22b with the step difference D formed on the emergent face 22 to have no diffracting action on the laser light beam L1 having a wavelength of 650 nm.

With the two-wavelength grating 2A constructed in the above manner, the incident face 21 diffracts the laser light beam L1 into three beams of the zeroth-order diffracted light beam L1A, the positive first-order diffracted light beam L1B and the negative first-order diffracted light beam L1C, and passes the laser light beam L2 directly. The emergent face 22 passes three laser light beams L1A, L1B and L1C, and diffracts the laser light beam L2 into three beams of the zeroth-order diffracted light beam L2A, the positive first-order diffracted light beam L2B and the negative first-order diffracted light beam L2C. Accordingly, the two-wavelength grating 2A can produce three beams with a desired diffraction angle for two-wavelengths L1 and L2.

The step differences D and D1 may be a size of producing a phase difference ($2\pi, 4\pi, \ldots$) equal to the integral multiple of the respective wavelengths.

As described above, according to the diffraction element of the present invention, a variation in the diffraction angle that is brought about by a wavelength variation of the laser light that arises along with a change in environmental temperature can be canceled or reduced by making positive use of a grating pitch variation caused by the change in environmental temperature. Accordingly, it is possible to avoid or suppress any trouble that may occur with the variation in the diffraction angle caused by the wavelength variation.

If the diffraction element of the invention is employed as a two-wavelength grating for generating three beams in an optical pickup device having a two-wavelength laser light source or an optical path composition element, the optical pickup device with the less number of parts and performance stability against the change in environmental temperature can be produced.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A diffraction element comprising a diffraction grating formed with a grating pitch, and having different diffraction angles and different diffraction efficiencies in accordance with a wavelength of a laser light beam incident thereon, the wavelength being variable in accordance with an environment temperature, wherein the diffraction element is made of a material having a linear expansion coefficient which causes thermal variation in the grating pitch enough to compensate at least a part of the diffraction angle variation due to environment temperature change, wherein the linear expansion coefficient falls within a range from $5 \times 10^{-5}/°$ C. to $3 \times 10^{-4}/°$ C.

2. The diffraction element as set forth in claim 1, wherein:

a zeroth-order diffraction efficiency with respect to one of a first incident light beam having a center wavelength of 650 nm and a second incident light beam having a center wavelength of 780 nm is 90% or more; and a first-order diffraction efficiency with respect to the other of the first incident light beam and the second incident light beam falls within a range from 10% to 20%.

3. The diffraction element as set forth in claim 1, wherein the diffraction grating is a blazed diffraction grating in which each slant face is composed of a plurality of stepped faces.

4. The diffraction element as set forth in claim 3, wherein each slant face includes 4 to 6 stepped faces.

5. The diffraction element as set forth in claim 3, wherein:

a zeroth-order diffraction efficiency with respect to one of a first incident light beam having a center wavelength of 650 nm and a second incident light beam having a center wavelength of 780 nm is 70% or more; and a first-order diffraction efficiency with respect to the other of the first incident light beam and the second incident light beam is 50% or more.

6. An optical pickup device, comprising:

a laser diode, which emits a laser light beam; and the diffraction element as set forth in claim 1, for producing three light beams incident on a recording face of an optical recording medium, from the laser light beam emitted by the laser diode.

7. An optical pickup device, comprising:

a first laser diode, which emits a first laser light beam having a first center wavelength;

a second laser diode, which emits a second laser light beam having a second center wavelength which is different from the first center wavelength;

a common light receiving element; and the diffraction element as set forth in claim 3, for leading the first laser light beam and the second light beam, which are reflected from a recording face of an optical recording medium, onto the common light receiving element.

8. A diffraction element comprising a diffraction grating formed with a grating pitch having different diffraction angles in accordance with a wavelength of a laser light beam incident thereon, the wavelength being variable in accordance with an environment temperature, wherein the diffraction element is made of a material having a linear expansion coefficient within a range from $5 \times 10^{-5}/°$ C. to $3 \times 10^{-4}/°$ C. which causes thermal variation in the grating pitch enough to compensate at least a part of the diffraction angle variation due to environment temperature change.

9. The diffraction element as set forth in claim 8, wherein:

a zeroth-order diffraction efficiency with respect to one of a first incident light beam having a center wavelength of 650 nm and a second incident light beam having a center wavelength of 780 nm is 90% or more; and a first-order diffraction efficiency with respect to the other of the first incident light beam and the second incident light beam falls within a range from 10% to 20%.

10. An optical pickup device, comprising:

a laser diode, which emits a laser light beam; and the diffraction element as set forth in claim 8, for producing three light beams incident on a recording face of an optical recording medium, from the laser light beam emitted by the laser diode.

11. A diffraction element comprising a blazed diffraction grating in which each slant face includes a plurality of stepped faces, and formed with a grating pitch having different diffraction angles in accordance with a wavelength of a laser light beam incident thereon, the wavelength being variable in accordance with an environment temperature, wherein the diffraction element is made of a material having a linear expansion coefficient which causes thermal variation in the grating pitch enough to compensate at least a part of the diffraction angle variation due to environment temperature change, and wherein a zeroth-order diffraction efficiency with respect to one of a first incident light beam having a center wavelength of 650 nm and a second incident light beam having a center wavelength of 780 nm is 70% or more; and a first-order diffraction efficiency with respect to the other of the first incident light beam and the second incident light beam is 50% or more.

12. An optical pickup device, comprising:

a first laser diode, which emits a first laser light beam having a first center wavelength;

a second laser diode, which emits a second laser light beam having a second center wavelength which is different from the first center wavelength;

a common light receiving element; and the diffraction element as set forth in claim 11, for leading the first laser light beam and the second light beam, which are reflected from a recording face of an optical recording medium, onto the common light receiving element.

* * * * *